July 25, 1950 M. SCHWARTZ ET AL 2,516,347
CAMERA BELLOWS HAVING ELECTRICALLY
CONDUCTING PORTIONS
Filed Dec. 3, 1945 2 Sheets-Sheet 2
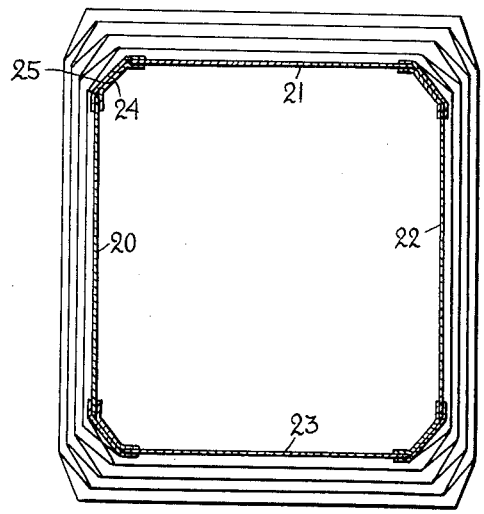
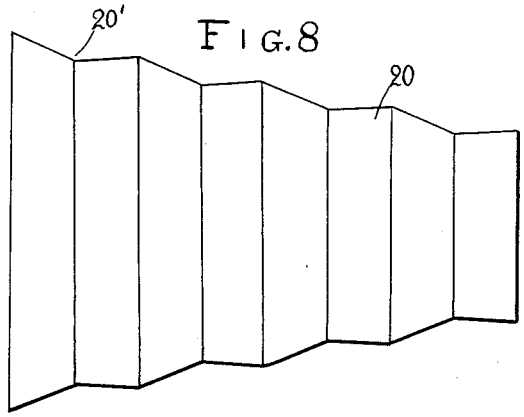
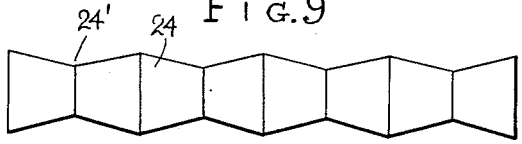
MORRIS SCHWARTZ
WILLIAM CASTEDELLO
INVENTOR
ATTORNEY Patented July 25, 1950

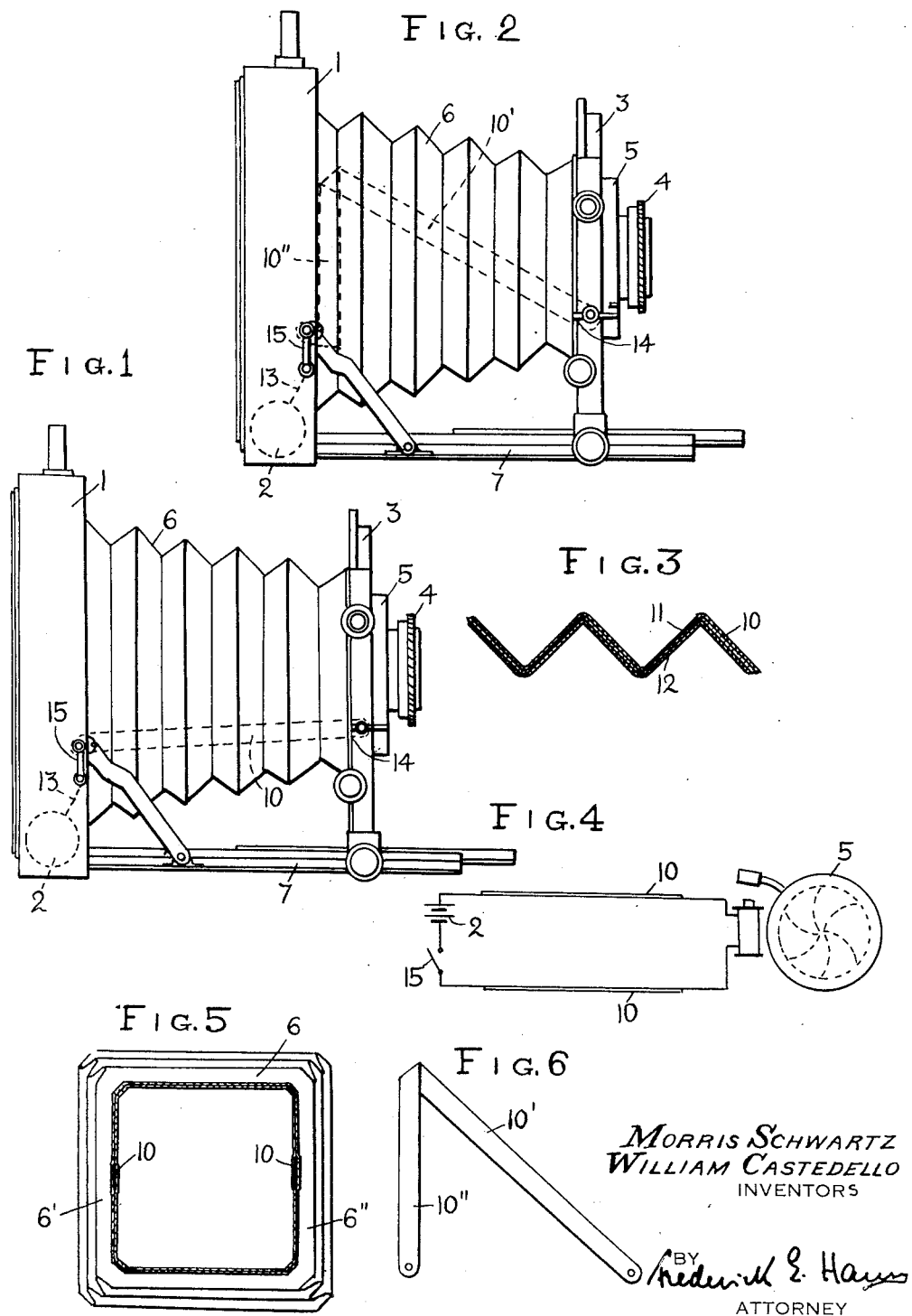

2,516,347

UNITED STATES PATENT OFFICE 2,516,347

CAMERA BELLOWS HAVING ELECTRICALLY CONDUCTING PORTIONS

Morris Schwartz and William Castedello, Stamford, Conn., assignors to The Kalart Company, Inc., Stamford, Conn.

Application December 3, 1945, Serial No. 632,438

2 Claims. (Cl. 95—39)

Our invention relates to improvements in electrically controlled photographic cameras, particularly to improvements in bellows for photographic cameras.

Photographic cameras having electrically controlled parts require electrical conductors connecting the source of current, such as a battery housed in the casing of the camera, to the electromagnet operating the shutter and/or other electrically operated parts of the camera. Certain of these conductors, as conventionally used, consist of loose wires or cables extending from the battery and connected to the shutter magnet or other parts of the camera by means of plugs or also permanently. Such loose wires or cables whether placed inside or outside of the bellows are subject to frequent damage by pulling, tearing or squeezing; in case of cables mounted at the outside it is also rather inconvenient to connect or disconnect the cables before and after use of the camera and to adjust the loose cables properly in the camera casing before folding the camera.

An object of our invention is to protect the electrical conductors for the shutter magnet and/or certain other parts of the camera against damage by improper handling and against undue strain.

Another object of our invention is an arrangement of the electrical conductors that permits a permanent connection of the conductors to the shutter magnet and/or other suitable part of the camera and also eliminates the necessity of a careful positioning of the conductors before folding the camera.

Another object of our invention is a neat, reliable and inexpensive wiring arrangement of the electric connections for the shutter magnet and/or other suitable parts of the camera.

Another object of our invention is an arrangement of the electric conductors in which the electric conductors simultaneously serve to stiffen the bellows to prevent sagging thereof.

Another object of our invention is to provide an arrangement of the electric conductors by which an appreciable bulging of the bellows caused by the conductors is avoided when the camera is closed and the bellows is tightly folded.

These and further features, objects and advantages of our invention are attained according to a now preferred embodiment of the invention by employing the bellows of the camera as carrier or support of the conductors, more specifically by using strips made of thin conducting material as conductors and placing these conducting strips between two layers of opposite walls of the bellows. The protruding ends of the conducting strips are connected to the battery and the shutter magnet and/or another suitable part of the camera.

In the accompanying drawings several embodiments of our invention are illustrated:

Fig. 1 shows diagrammatically a conventional camera of the bellows type in its open position, equipped with conductors according to the invention.

Fig. 2 shows a modification of the conductor arrangement in conjunction with the same type of camera as shown in Fig. 1.

Fig. 3 is a fractional longitudinal section of a bellows in which a conducting strip is embedded in accordance with our invention.

Fig. 4 is a circuit diagram showing the inclusion of conducting strips according to our invention in the circuit of a shutter magnet.

Fig. 5 is a sectional front view of a bellows in which the conducting strips are inserted between opposite side walls of the bellows.

Fig. 6 is a plan view of a conducting strip as used in a bellows according to Fig. 2.

Fig. 7 is a sectional front view of a modification of the invention in which the conductors form part of the bellows walls.

Fig. 8 is a side view of one of the conductors constituting one of the bellows walls, and Fig. 9 is a plan view of an insulating strip employed for connecting two walls of a bellows according to Fig. 7.

The electrically controlled camera as shown in Figs. 1 and 2 comprises a casing 1, a battery 2 fitted in the casing, or otherwise associated with the camera, a lens support 3 also supporting the bellows, a lens 4 supported on support 3, an electromagnetically operated shutter 5, a bellows 6 extending from casing 1 to support 3, and a camera bed 7. Since the camera may be of conventional design, a detailed description of the camera and its operation is not deemed necessary. It should be noted in this connection that our invention is useful for and applicable to any camera of the bellows type requiring electric connections. The term "bellows" as used in our application refers to any foldable and extensible structures and devices for the purposes of forming a light tight enclosure of varying volume.

According to our invention we avoid and eliminate any wires or cables in or outside of the bellows and employ conductors as shown in the figures.

Referring now more specifically to Figs. 1 and 3, there are shown conductors consisting of strips 10 made of a metal foil or sheet metal having satisfactory electrical conductivity, and also sufficient flexibility and pliability to permit frequent bending and stretching without breaking. We have found that various copper alloys as conventionally used for electric conductors will give good results. The material used for the strips should be as thin as possible. A strip having a thickness of .0015 inch and a width of one-half inch has been found by us to be satisfactory. The thickness of the material of the strip is preferably between .0010 inch and .0050 inch. The width of the strip depends on the thickness of the strip material and should be selected so that the electric resistance of the strip is within suitable limits; it may be between one-quarter of an inch and one and one-half of an inch.

Instead of metal foil or sheet metal sufficiently fine metal braid or strands of wire may be employed as material for the strips. Furthermore, conducting paint may be used to form the conducting strips.

Strips 10 are placed flatly between two layers 11 and 12 of two walls, preferably between two opposite side walls 6' and 6" of the bellows, as best shown in Fig. 5. Since the bellows is conventionally made at least partly of insulating material, special insulation of the strip is unnecessary. The protruding ends of the strips are connected at one end to battery 2 and at the other end to shutter magnet 5 either directly or by means of intermediate wires 13 and 14 respectively.

Experience shows that bellows have a certain tendency to sag after a certain time of use in spite of the card board stiffener usually filling the bellows walls. Such sagging of the bellows is very undesirable since it may cut off part of the picture. The placement of two strips in different walls of the bellows, particularly in two opposite side walls of the bellows effectively counteracts such tendency to sag since the strips in spite of their thinness have considerable strength.

The strips 10 may be placed substantially parallel to the camera bed 7, as shown in Fig. 1. Then, the folds formed by the strips, when the camera is closed and the bellows is folded, will lie one on top of the other.

We have found that thin strips, as previously described do not affect substantially the pliability or thickness of the bellows so that a bellows according to the invention can be folded and extended in the same manner as a bellows without inserted conducting strips.

Fig. 4 shows diagrammatically the circuit of the shutter magnet 5 including two conducting strips 10. When switch 15 is closed the shutter magnet is energized and will actuate the shutter.

In certain cases any bulging of the bellows caused by the strips is undesirable. Such bulging is somewhat unsightly, also the deformation of the bellows due to the folds formed by the strips will contribute to deterioration of the bellows during use.

Fig. 2 shows a modification of our invention by which any appreciable bulging of the bellows is avoided. According to this figure, strips 10' are inserted in slanted positions between two layers of opposite side walls. As a result, each fold of the strips will be formed at a different part of the bellows, when the bellows is folded together. Consequently, the folds formed by the strips are distributed over a wider area.

The strips 10, 10' may be slanted downwardly toward the lens support, or vice versa. In order to connect strips 10' with switch 15, a bent-off section 10" is provided at each strip, as shown in Fig. 6. However, it is of course also possible to solder wire connections to strips 10'.

Instead of slanting straight strips, shaped strips, such as meander-shaped or undulated strips may be employed to attain a distribution of the folds. Finally, it is also possible to slant the two strips in different directions.

In the embodiments of the invention shown in Figs. 1 and 2 and in the companion figures, the conducting strips are inserted between two layers of the walls of an otherwise conventional bellows. However, it is within the scope of the invention and quite practical under certain circumstances to make two or more of the walls of the bellows of electrical conducting material such as thin sheet metal and to join the conducting walls by foldable wall portions made of insulating material such as is used for conventional bellows.

Fig 7 shows a sectional front view of a bellows comprising four walls 20, 21, 22 and 23 made of thin metal. Each of the walls is creased and shaped in a conventional manner to form accordion folds when the bellows is folded.

Fig. 8 shows a side view of one of the walls, to wit: wall 20.

The conducting walls are joined by inner and/or outer strips 24 and 25 made of foldable insulating material such as fabric, leather or a suitable plastic.

Fig. 9 shows the shape of one of the strips 24 or 25 when flattened. As it will be seen from this figure, each of the strips is provided with triangular recesses 24" which correspond to triangular recesses such as 20' of the bellow walls. The recesses of the bellow walls and of the strips must be selected, as it is well known in the art, in such a manner that the bellows can be smoothly and tightly folded.

The strips may be fastened to the metal walls of the bellows by any suitable means such as pasting or molding. It will be evident that all conventional precautions must be taken to secure a connection impervious to light and to avoid a reflection of light by the metal walls. As it will appear from the previous explanations, the metal walls of the bellows correspond to strips 10 or 10'. They serve to connect the shutter magnet or any other electrical operated part of the camera with the battery and also to stiffen the bellows to prevent a sagging thereof.

Instead of joining the metal walls of the bellows by strips such as 24 and 25 pasted or molded to the metal walls of the bellows, it is also possible and within the scope of the invention to join the metal walls by a coating made of plastic covering the entire metal walls. It is evident that all requirements as to complete tightness against the penetration of light must be always satisfied.

Our invention shall not be limited to the embodiments shown but various changes and alterations may be made without departing from the scope of our invention.

What we claim as new and desire to secure by Letters Patent is as follows:

1. An accordion bellows for photographic apparatus comprising tapered strips made of electrical conducting material creased substantially vertically to the strip axis to form a plurality of folds of substantially equal widths, and strips made of foldable insulation material each secured to the metal strips for joining the said strips together and insulating one from the other.

2. A bellows as described in claim 1 wherein the said metal strips are partly embedded in said foldable insulation material.

MORRIS SCHWARTZ.
WILLIAM CASTEDELLO.

REFERENCES CITED

The following references are of record in the file of this patent:

UNITED STATES PATENTS

| Number | Name | Date |
|---|---|---|
| 473,358 | Servus | Apr. 19, 1892 |
| 1,908,531 | Noble | May 9, 1933 |
| 2,143,125 | Headlee | Jan. 10, 1939 |
| 2,145,917 | Boesser | Feb. 7, 1939 |

FOREIGN PATENTS

| Number | Country | Date |
|---|---|---|
| 221,211 | Switzerland | May 15, 1942 |
| 543,054 | Great Britain | Feb. 9, 1942 |